United States Patent
Narusawa

(10) Patent No.: US 9,177,358 B2
(45) Date of Patent: Nov. 3, 2015

(54) INFORMATION PROCESSING APPARATUS, INFORMATION PROCESSING METHOD, AND PROGRAM THEREFOR

(75) Inventor: Ryu Narusawa, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 452 days.

(21) Appl. No.: 13/164,371

(22) Filed: Jun. 20, 2011

(65) Prior Publication Data

US 2011/0317937 A1    Dec. 29, 2011

(30) Foreign Application Priority Data

Jun. 28, 2010   (JP) ................................ 2010-146666

(51) Int. Cl.
| | |
|---|---|
| *G06K 9/32* | (2006.01) |
| *G06T 3/40* | (2006.01) |
| *H04N 5/232* | (2006.01) |
| *G06T 7/00* | (2006.01) |
| *H04N 1/387* | (2006.01) |

(52) U.S. Cl.
CPC .......... *G06T 3/4038* (2013.01); *H04N 5/23238* (2013.01); *G06T 7/0024* (2013.01); *G06T 2200/32* (2013.01); *H04N 1/3876* (2013.01)

(58) Field of Classification Search
CPC . G06T 3/4038; G06T 7/0024; G06T 2200/32; H04N 5/23238; H04N 1/3876; G06K 2009/2045; G02B 21/367
USPC ........................................................ 382/294
See application file for complete search history.

(56) References Cited

U.S. PATENT DOCUMENTS

| | | | | |
|---|---|---|---|---|
| 4,979,225 | A | * | 12/1990 | Tsujiuchi et al. ............. 382/165 |
| 6,148,118 | A | * | 11/2000 | Murakami et al. ............ 382/284 |
| 6,804,406 | B1 | * | 10/2004 | Chen ............................. 382/254 |
| 7,446,863 | B2 | * | 11/2008 | Nishita et al. ............ 356/139.04 |
| 2007/0098293 | A1 | * | 5/2007 | Xu et al. ....................... 382/264 |

FOREIGN PATENT DOCUMENTS

JP         09-091419        4/1997

* cited by examiner

*Primary Examiner* — Kim Vu
*Assistant Examiner* — Michael Vanchy, Jr.
(74) *Attorney, Agent, or Firm* — K&L Gates LLP

(57) ABSTRACT

An information processing apparatus is provided that includes an obtaining section and a selecting section. The obtaining section obtains information of first and second images that each have an overlapped region where the first image and the second image are overlapped and constitute a taken image including an image part of a subject by being connected with each other with the overlapped region as a reference. The selecting section determines pixels other than the image part of the subject based on information of a plurality of pixels that belong to the overlapped region of the first image where the first image is overlapped with the second image, the information of the plurality of pixels being included in the obtained information of the first image, and selects, out of the determined pixels, a connection pixel corresponding to a position where the first image and the second image are connected in the overlapped region.

5 Claims, 15 Drawing Sheets

INFORMATION PROCESSING APPARATUS, INFORMATION PROCESSING METHOD, AND PROGRAM THEREFOR

CROSS REFERENCE TO RELATED APPLICATIONS

The present disclosure claims priority to that disclosed in Japanese Priority Patent Application JP 2010-146666 filed in the Japan Patent Office on Jun. 28, 2010, the entire content of which is hereby incorporated by reference.

BACKGROUND

The present disclosure relates to an information processing apparatus to which a plurality of images can be connected, an information processing method, and a program therefor which are capable of connecting a plurality of images.

In related art, a switching technique for connecting a plurality of images having a physically continuous content is known, and the technique is used for a panoramic image taking, a microscopic image taking, or the like. For example, a template matching or the like is performed with respect to an entire region where a plurality of images are overlapped with each other. As a result, an offset value for optimizing a mutual positional relationship of the plurality of images to be connected is calculated. Then, on the basis of the offset value calculated, the plurality of images are connected.

For example, Japanese Patent Application Laid-open No. Hei 09-91410 (hereinafter, referred to as Patent Document 1) discloses a panoramic image synthesis system as follows. A user specifies a point at which a left image and a right image that are connected with each other are matched as a user specified point. A template image which is cut out around the specified point of the left image is overlapped with a search range having the center of the specified point of the right image. In the search range, the position where the template image is most matched is calculated as a true correspondence point. On the basis of the correspondence point, a synthesis parameter for appropriately connecting the left image and the right image with each other is calculated (see, for example, paragraphs 0054 to 0071 and FIGS. 10 and 11 in Patent Document 1).

At the time when the left image and the right image are synthesized, as shown in FIG. 12 in Patent Document 1, the left image and the right image which is positioned on the basis of the synthesis parameter are overlapped with each other. In the overlapped region of the images, pixel data of the left image is used for the entire region. That is, a part of the right image is connected to the entire left image, thereby generating a synthesis image (see, for example, paragraphs 0072 to 0079 and FIG. 12 in Patent Document 1).

SUMMARY

In the panoramic image synthesis system disclosed in Patent Document 1, on a boundary of the left image and the right image in the region where the images are overlapped with each other, that is, a part corresponding to an end portion of the left image, a taken image of a subject may be disposed. In this case, for example, due to an optical distortion or the like at the time when the images are taken, the image of the subject disposed on the boundary is not appropriately connected, and the shape of the image may be distorted.

In view of the above-mentioned circumstances, it is desirable to provide an information processing apparatus, an information processing method, and a program therefor which are capable of connecting a plurality of images so that a subject is appropriately represented in a region where the plurality of images are overlapped with each other.

According to an embodiment, there is provided an information processing apparatus including an obtaining section and a selecting section.

The obtaining section is configured to obtain information of a first image and information of a second image. The first image and the second image each have an overlapped region where the first image and the second image are overlapped with each other and constitute a taken image including an image part of a subject by being connected with each other with the overlapped region as a reference.

The selecting section is configured to determine pixels other than the image part of the subject based on information of a plurality of pixels that belong to the overlapped region of the first image where the first image is overlapped with the second image, the information of the plurality of pixels being included in the obtained information of the first image, and select, out of the pixels determined other than the image part of the subject, a connection pixel corresponding to a position where the first image and the second image are connected in the overlapped region.

In the information processing apparatus, in the overlapped region of the first image where the first image is overlapped with the second image, the pixels other than the image part of the subject are determined, and from the pixels determined, the connection pixel corresponding to the position where the first image and the second image are connected with each other is selected. Therefore, it is possible to prevent that the image of the subject is positioned on a boundary between the first image and second image connected, and the shape of the image is distorted. As a result, it is possible to connect the first and second images so that the subject is appropriately represented in the overlapped region where the first and second images are overlapped.

The obtaining section may be configured to obtain the information of the first image and the second image that each have a plurality of pixels arranged in two axis directions perpendicular to each other and are connected to each other in a first direction out of the two axis directions. In this case, the selecting section may be configured to determine the pixels other than the image part of the subject based on a variance value of a luminance signal row for each of pixel rows that are arranged in a second direction different from the first direction out of the two axis directions and select the pixel row having a smallest variance value as the connection pixel.

In the information processing apparatus, the pixels other than the image part of the subject are determined on the basis of the variance value of the luminance signal row for each of the pixel rows, and the pixel row having the smallest variance value is selected as the connection pixel. For example, a pixel row having a variance value smaller than a predetermined value may be determined as the pixels other than the image part of the subject. Alternatively, the pixel row having the smallest variance value may be determined as the pixels other than the image part of the subject.

The obtaining section may be configured to obtain the information of the first image and the second image that each have a plurality of pixels arranged in two axis directions perpendicular to each other and are connected to each other in a first direction out of the two axis directions. In this case, the selecting section may be configured to determine the pixels other than the image part of the subject based on a frequency component of a luminance signal row for each of pixel rows that are arranged in a second direction different from the first direction out of the two axis directions and select the pixel row having a smallest high frequency component as the connection pixel.

In the information processing apparatus, the pixels other than the image part of the subject are determined on the basis of the frequency component of the luminance signal row for each of the pixel rows, and the pixel row having the smallest high frequency component is selected as the connection pixel. For example, a pixel row having a high frequency component smaller than a predetermined value may be determined as the pixels other than the image part of the subject. Alternatively, the pixel row having the smallest high frequency component may be determined as the pixels other than the image part of the subject.

The obtaining section may be configured to obtain the information of the first image and the second image that each have a plurality of pixels arranged in two axis directions perpendicular to each other and are connected to each other in a first direction out of the two axis directions. In this case, the information processing apparatus may further include a generating section configured to generate a plurality of block images that divide, in the first direction and a second direction that is different from the first direction out of the two axis directions, the overlapped region of the first image where the first image is overlapped with the second image. Further, the selecting section may be configured to select a plurality of connection block images along the second direction that are the block images each having a smallest variance value in the plurality of block images arranged in the first direction, based on a variance value of a luminance signal group for each of the plurality of block images, and select the connection pixel from pixels that belong to the plurality of connection block images selected.

In the information processing apparatus, the variance value of the luminance value for each of the block images is calculated, and the plurality of connection block images as the block images having the smallest variance value are selected along the second direction from the plurality of block images arranged in the first direction. The pixels that belong to the connection block images are determined as the pixels other than the image part of the subject, and the connection pixel is selected from the pixels that belong to the connection block images.

According to another embodiment, there is provided an information processing method executed by an information processing apparatus as follows.

That is, the information processing apparatus obtains information of a first image and information of a second image. The first image and the second image each have an overlapped region where the first image and the second image are overlapped with each other and constitute a taken image including an image part of a subject by being connected with each other with the overlapped region as a reference.

Pixels other than the image part of the subject are determined based on information of a plurality of pixels that belong to the overlapped region of the first image where the first image is overlapped with the second image, the information of the plurality of pixels being included in the obtained information of the first image, and out of the pixels determined other than the image part of the subject, a connection pixel corresponding to a position where the first image and the second image are connected in the overlapped region is selected.

According to another embodiment, there is provided a program that causes an information processing apparatus to execute the aforementioned information processing method. The program may be recorded in a recording medium.

As described above, according to the embodiments, it is possible to connect the plurality of images so that the subject is represented appropriately in the region where the plurality of images are overlapped with each other.

These and other objects, features and advantages of the present disclosure will become more apparent in light of the following detailed description of best mode embodiments thereof, as illustrated in the accompanying drawings.

DETAILED DESCRIPTION

Hereinafter, an embodiment will be described with reference to the drawings.

First Embodiment

Structure of Information Processing Apparatus

Figure 1:
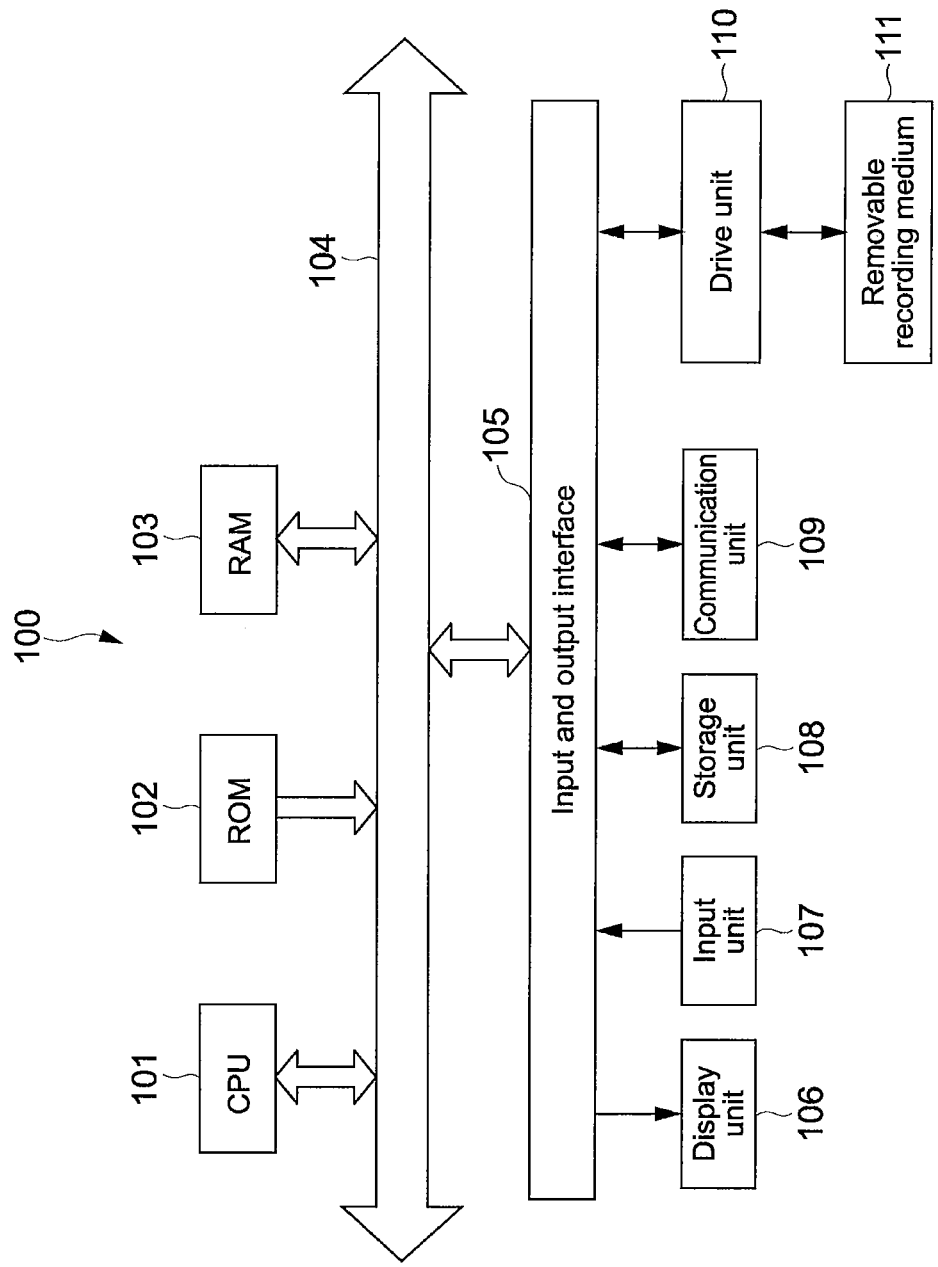
FIG. 1 is a block diagram showing the structure of an information processing system including at least an information processing apparatus according to a first embodiment.

FIG. 1 is a block diagram showing the structure of an information processing system including at least an information processing apparatus according to a first embodiment. As the information processing apparatus, for example a PC (personal computer) 100 is used.

The PC 100 is provided with a CPU (central processing unit) 101, a ROM (read only memory) 102, a RAM (random access memory) 103, an input and output interface 105, and a bus 104 by which those components are connected with each other.

To the input and output interface 105, a display unit 106, an input unit 107, a storage unit 108, a communication unit 109, a drive unit 110, and the like are connected.

The display unit 106 is a display device using liquid crystal, an EL (electro-luminescence), a CRT (cathode ray tube), or the like.

The input unit 107 is an operation apparatus such as a pointing device, a keyboard, and a touch panel. In the case where the input unit 107 includes a touch panel, the touch panel can be integrated with the display unit 106.

The storage unit 108 is a non-volatile storage device, and is for example, an HDD (hard disk drive), a flash memory, or another solid-state memory.

The drive unit 110 is a device which is capable of driving a removable recording medium 111 such as an optical recording medium, a floppy (registered trademark) disk, a magnetic recording tape, and a flash memory. In contrast, the storage unit 108 is used as a device which is mounted on the PC 100 in advance and mainly drives a non-removable recording medium in many cases.

The communication unit 109 is, for example, a modem, a router, or another communication apparatus for communicating with another device, which is connectable to a LAN (local area network), a WAN (wide area network), or the like. The communication unit 109 may perform wire or wireless communication. The communication unit 109 is often used separately from the PC 100.

(Operation of Information Processing Apparatus)

Figure 2:
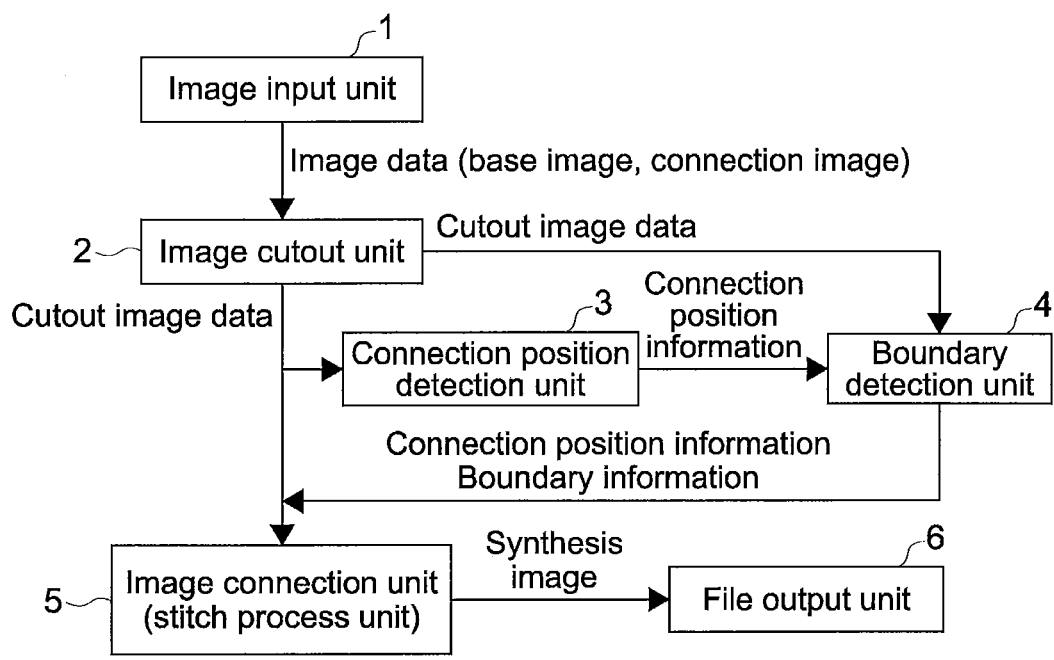
FIG. 2 is a software block diagram for processing of a PC according to the first embodiment.
Figure 3:
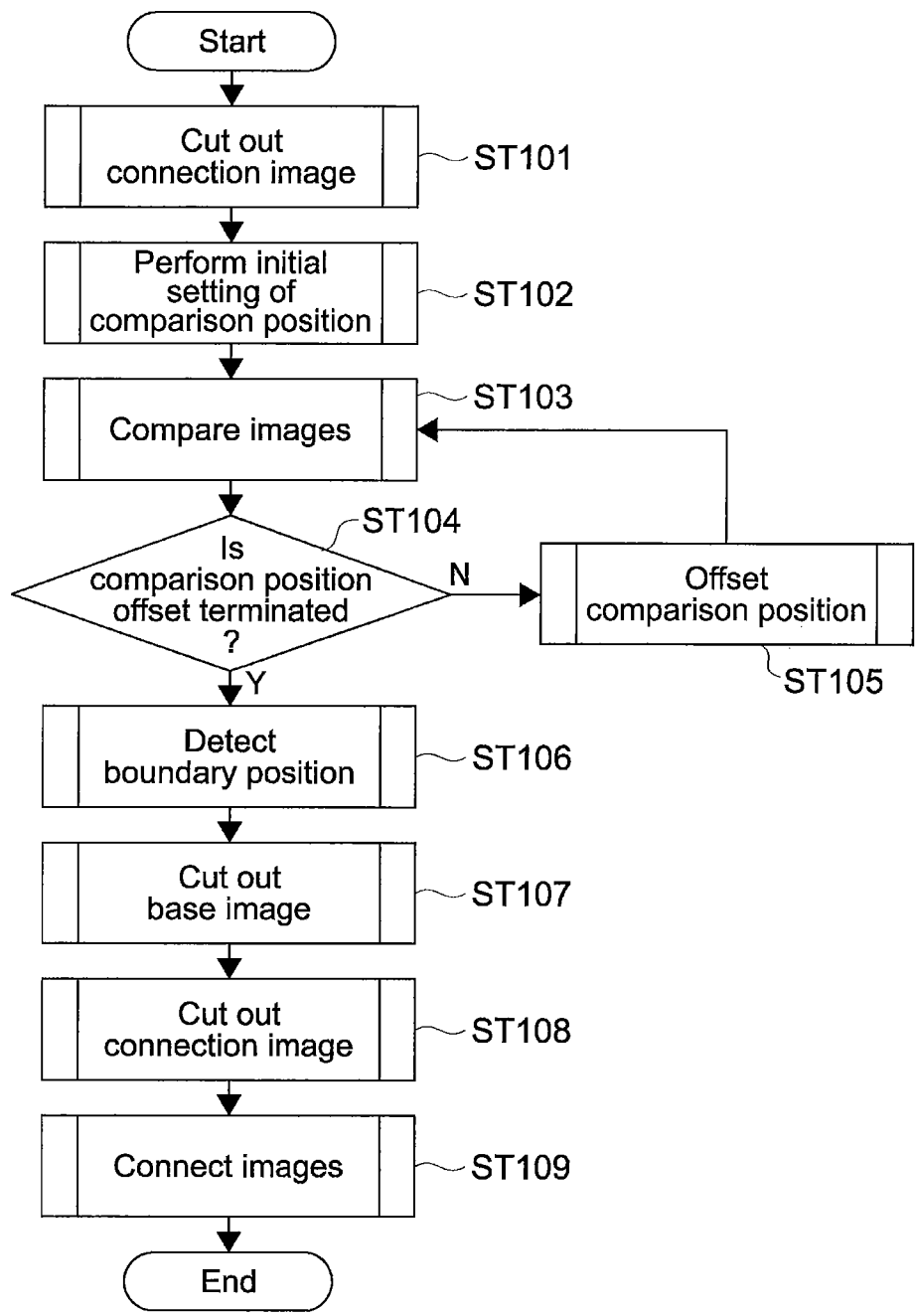
FIG. 3 is a flowchart showing the outline of the processing of the PC shown in FIG. 1.

The operation of the PC 100 of this embodiment will be described. FIG. 2 is a software block diagram for processing of the PC 100. FIG. 3 is a flowchart showing the outline of the processing of the PC 100.

The following processing of the PC 100 is achieved in cooperation with software stored in the storage unit 108, the ROM 102, or the like and a hardware resource of the PC 100. Specifically, the CPU 101 loads and executes programs that constitute the software and are stored in the storage unit 108, the ROM 102, or the like, thereby achieving the following processing.

That is, the PC 100 according to this embodiment functions as an image input unit 1, an image cutout unit 2, a connection position detection unit 3, a boundary detection unit 4, an image connection unit (stitch process unit) 5, and a file output unit 6, which are shown in FIG. 2. The PC 100 performs the steps shown in the flowchart of FIG. 3.

Figure 4:
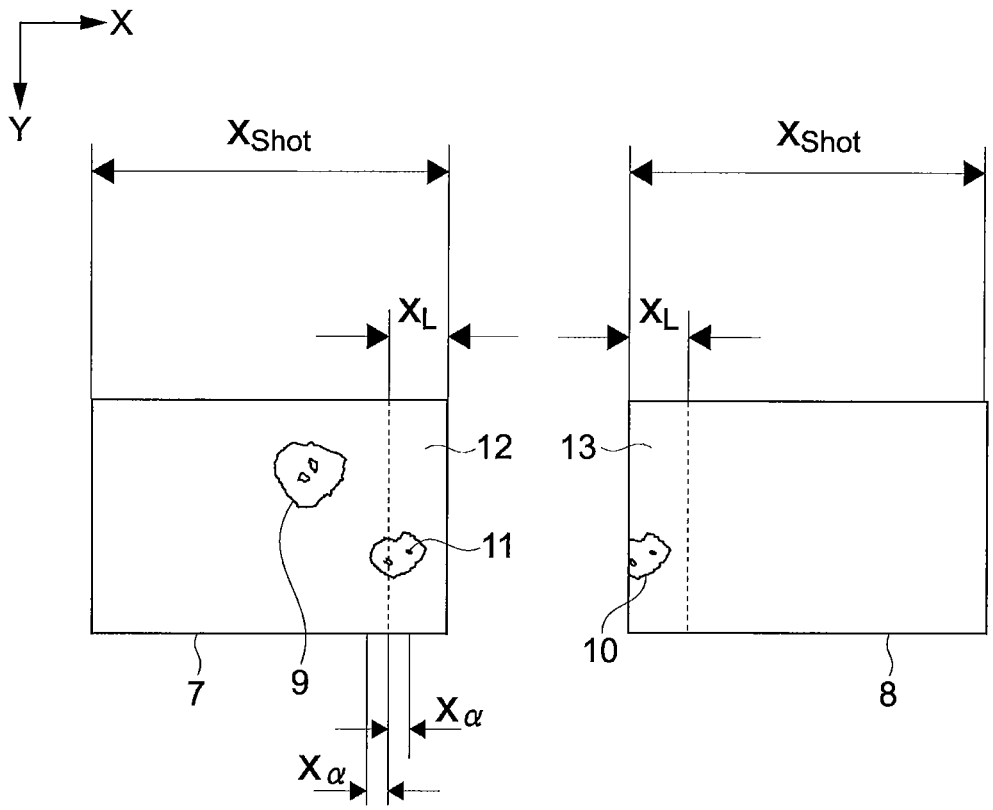
FIG. 4 is a schematic diagram showing a connection image and a base image which are subjected to a stitching process by the PC shown in FIG. 1.
Figure 5:
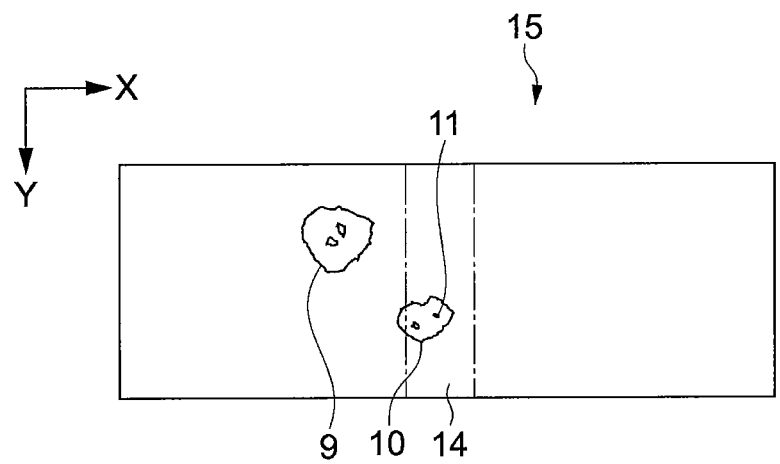
FIG. 5 is a schematic diagram showing the connection image and the base image which are subjected to a stitching process by the PC shown in FIG. 1.

To the image input unit 1 as an obtaining section, information of a connection image as a first image connected by the stitching process and information of a base image as a second image are input. In this embodiment, the information of the base image and the connection image that have been subjected to a development process is input to the image input unit 1. FIGS. 4 and 5 are schematic diagrams showing the connection image and the base image. It should be noted that in this embodiment, out of an X-axis direction (horizontal axis) and a Y-axis direction (vertical axis), which are two axis directions perpendicular to each other, the connection in the X-axis direction is described as an example for ease of explanation.

A base image 7 and a connection image 8 according to this embodiment are taken by an image pickup apparatus capable of taking an image of a subject which is obtained by an optical microscope (not shown), for example. As the subject, a living body cell which is fluorescently stained is used. Therefore, as shown in FIGS. 4 and 5, the base image 7 and the connection image 8 include a cell fluorescence image 10 and a nucleus fluorescence image 11 in the cell as an image part 9 of the subject.

The base image 7 is taken, a stage of the optical microscope is moved, and the connection image 8 is taken. At this time, by controlling the movement of the stage, as shown in FIG. 4, the images 7 and 8 are taken so as to have allowance regions 12 and 13 for the stitching process, respectively.

By using the allowance regions 12 and 13, an overlapped region 14 where the base image 7 and the connection image 8 are overlapped with each other is determined, and as shown in FIG. 5, the base image 7 and the connection image 8 are connected with the overlapped region 14 being as a reference. Then, a taken image 15 including the image part 9 (cell fluorescence image 10 and nucleus fluorescence image 11) of the subject is formed.

The sizes of the base image 7 and the connection image 8 are determined on the basis of the magnification of an optical system of the optical microscope, the size of an image sensor of the image pickup apparatus, or the like. That is, the value of a size xShot of the base image 7 and the connection image 8 shown in FIG. 4 in the X-axis direction is mainly determined on the basis of a hardware factor. The base image 7 and the connection image 8 of this embodiment have a plurality of pixels (not shown) which are arranged in the X-axis direction and the Y-axis direction, which are the two-axis directions perpendicular to each other. Further, the size of each of the base image 7 and the connection image 8 is 50×50 (Kpixel) or 40×60 (Kpixel). However, the size of the base image 7 and the connection image 8 is not limited to those.

The value of a size xL of each of the allowance region 12 of the base image 7 and the allowance region 13 of the connection image 8 in the X-axis direction is determined within such a range that the stitching process can be performed on the basis of the features of the base image 7 and the connection image 8. The value of the size xL of each of the allowance regions 12 and 13 in the X-axis direction is set to approximately 5% to 20% of the value of the size xShot of the base image 7 and the connection image 8 in the X-axis direction, for example.

At the time when the base image 7 and the connection image 8 are taken, due to a mechanical factor such as a movement error of the stage, an error may be caused in a relative positional relationship between the base image 7 and the connection image 8. For this reason, in the case where the base image 7 and the connection image 8 are positioned in the X-axis direction, a variation xα based on the error has to be considered. In this embodiment, the value of approximately 5% of the size xL of the allowance regions 12 and 13 is thought as the variation xα.

The information of the base image 7 and the connection image 8 which is input to the image input unit 1 is output to the image cutout unit 2.

The image cutout unit 2 cuts out the image of the allowance region 13 of the connection image 8 as a comparison block image 16 (see, FIGS. 6A and 6B) (Step 101 of FIG. 3). As the comparison block image 16, a region larger or smaller than the allowance region 13 may be cut out. The information of the comparison block image 16 is output to the connection position detection unit 3 and the boundary detection unit 4.

The connection position detection unit 3 performs a matching process of the comparison block image 16 and the base image 7, and a coordinate at which an optimal matching is obtained is calculated. FIGS. 6A, 6B, 6C and 7 are diagrams for explaining the matching process.

Figure 6A:
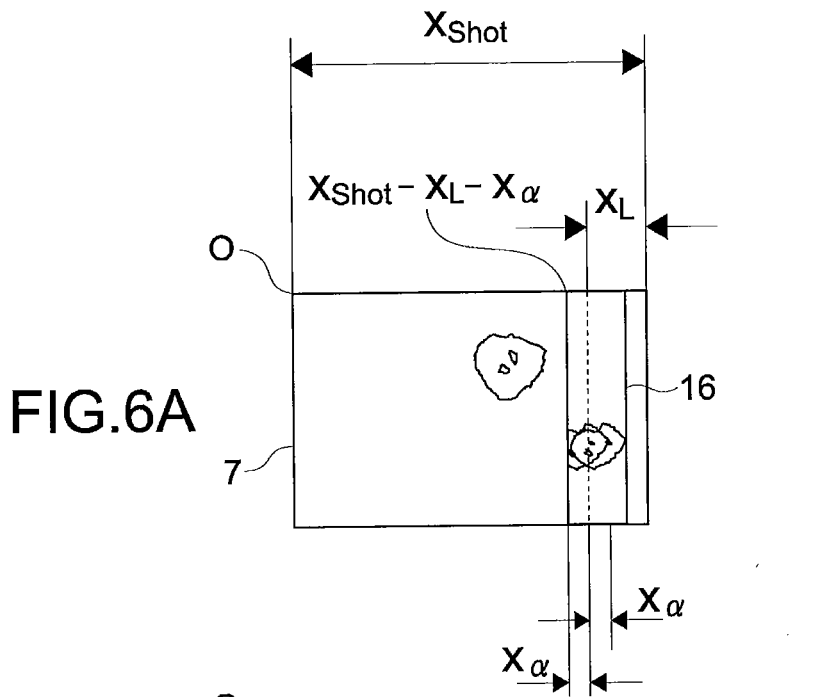
FIGS. 6A, 6B and 6C are diagrams for explaining a matching process of a comparison block image and the base image by the PC shown in FIG. 1.

An initial setting of a comparison position of the comparison block image 16 and the base image 7 is performed (Step 102 of FIG. 3). The position of the initial setting in this embodiment is a position, the x coordinate of which is (xShot-xL−xα), as shown in FIG. 6A. It should be noted that in this embodiment, the coordinate is set with an end point O at the upper left of the base image 7 as a reference.

At the position of the initial setting shown in FIG. 6A, the matching process of the comparison block image 16 and the base image 7 is performed (Step 103). The matching process is carried out by calculating a luminance value for each pixel in a region where the comparison block image 16 and the base image 7 are overlapped with each other and calculating an autocorrelation coefficient on the basis of the luminance value calculated, for example. Alternatively, the matching process may be carried out by calculating a square of a difference of the luminance values for each pixel in the overlapped region. In addition, it is possible to use various algorisms used for an image pattern matching.

Figure 6B:
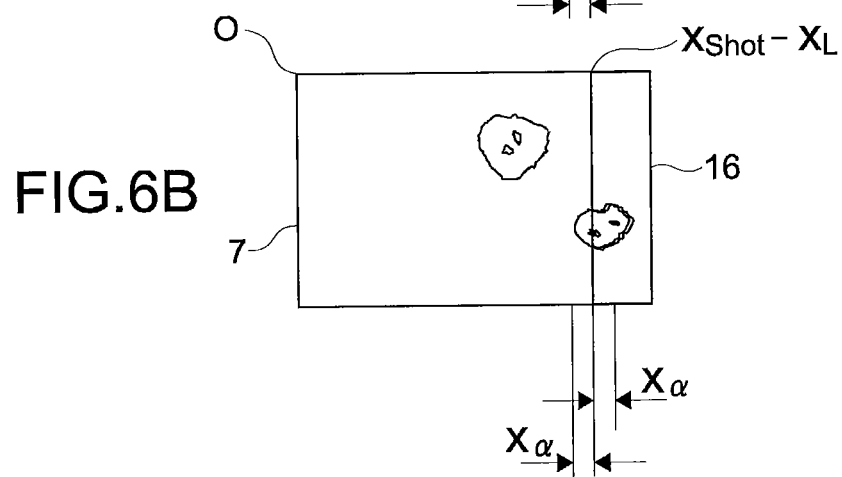
Figure 6C:
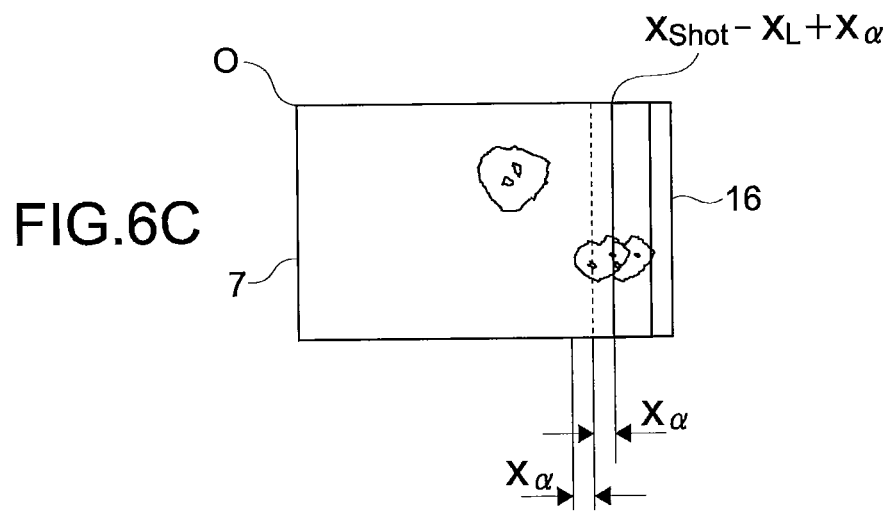
Figure 7:
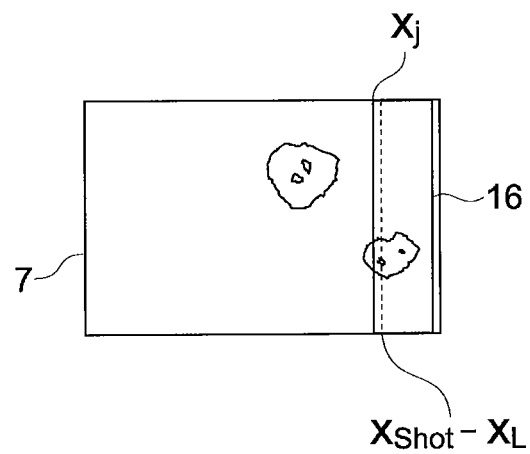
FIG. 7 is a schematic diagram showing the comparison block diagram and the base image which have been subjected to the matching process by the PC shown in FIG. 1.

It is judged whether or not an offset of the comparison position reaches a position, the x coordinate of which is (xShot-xL+xα) (Step 104). In the case where the offset process of the comparison position is not completed, the comparison position is offset to the right side by the unit of one pixel or the unit of a plurality of pixels for the purpose of speedup of the process (Step 105). That is, as shown in FIGS. 6A to 6C, the comparison block image 16 and the base image 7 are subjected to the matching process within the range of the x coordinate of (xShot-xL−xα to xShot-xL+xα). As a result, as shown in FIG. 7, an offset coordinate xj, at which the autocorrelation coefficient is highest on the base image 7, is calculated as a position which is appropriate for natural connection of the base image 7 and the connection image 8. The overlapped region 14 of the base image 7 and the connection image 8 shown in FIG. 5 corresponds to the region where the base image 7 and the connection image 8 are overlapped with each other in the case where the connection image 8 is disposed at the position of the offset coordinate xj. Therefore, in the case where the offset coordinate xj coincides with the coordinate (xShot-xL), the allowance regions 12 and 13 correspond to the overlapped region 14. The information of the offset coordinate xj is output to the boundary detection unit 4 as connection position information.

The boundary detection unit 4 detects connection pixels corresponding to the position on which the base image 7 and the connection image 8 are connected with each other in the overlapped region 14 where the images 7 and 8 are overlapped with each other (Step 106). That is, the connection pixels are pixels which are located on the boundary of the base image 7 and the connection image 8.

Figure 8:
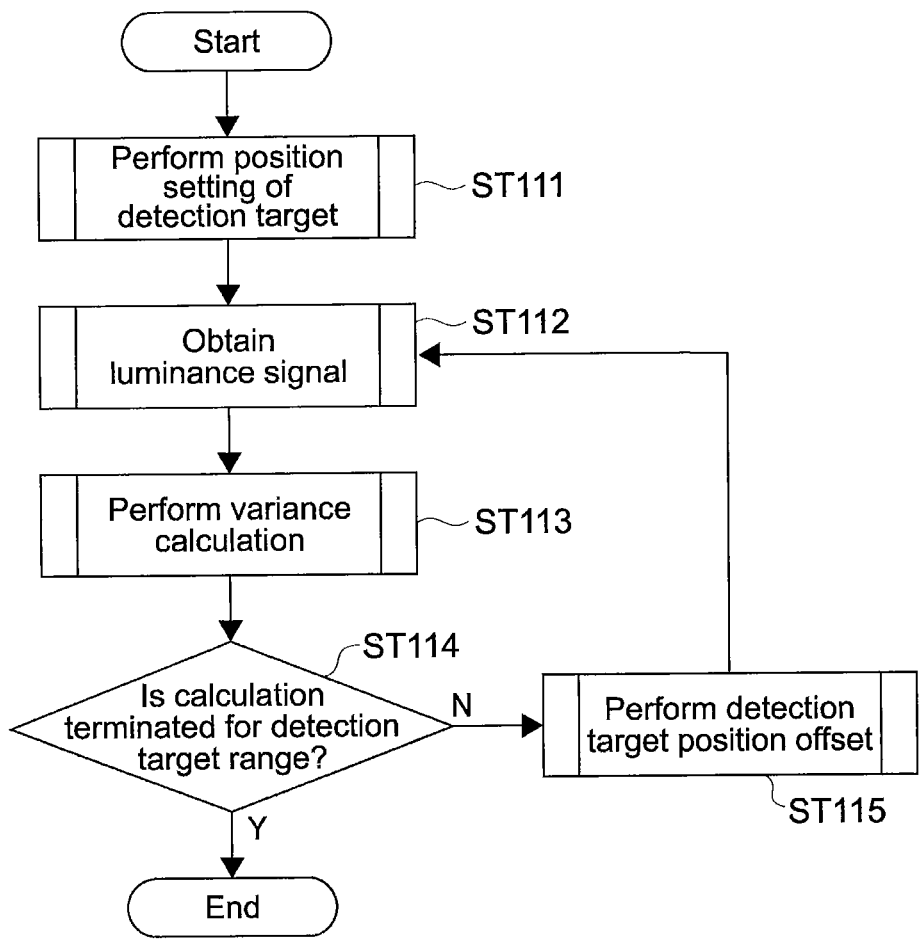
FIG. 8 is a flowchart showing the outline of a boundary detection process by the PC shown in FIG. 1.
Figure 9A:
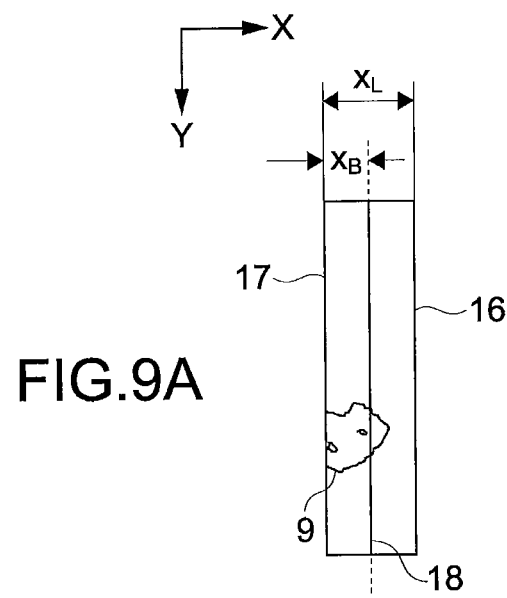
FIGS. 9A and 9B are diagrams for explaining the boundary detection process by the PC shown in FIG. 1.
Figure 9B:
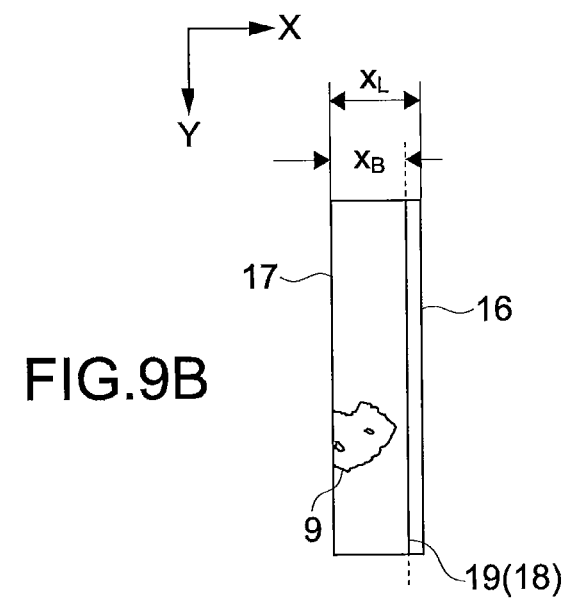

FIG. 8 is a flowchart showing the outline of a boundary detection process by the PC 100. FIGS. 9A and 9B are diagrams for explaining the boundary detection process.

A detection target position xB in the comparison block image 16 is set (Step 111). In this embodiment, as a position of an initial setting of a detection target, a position 17 at the left corner of the comparison block image 16 shown in FIGS. 9A and 9B is used, and the position is expressed as xB=0.

A luminance signal row of a pixel row 18, which is extended in the Y-axis direction, at the position xB=0 of the initial setting of the detection target position is obtained (Step 112). It should be noted that, for the luminance signal row of the pixel row 18, the luminance value of the comparison block image 16 which is obtained for the matching process performed by the connection position detection unit 3 may be used.

A variance value of the luminance signal row of the pixel row 18 of the detection target position xB=0 is calculated (Step 113). It is judged whether the calculation of the luminance signal row is terminated or not within the range of xB=0 to xL as a detection target range (Step 114). In the case where it is judged that the calculation of the luminance signal row is not terminated in the detection target range (No in Step 114), the detection target position xB is offset to the right side by one pixel (Step 115).

That is, as shown in FIG. 9A, in the comparison block image 16, the luminance signal row is obtained for each pixel row 18 which is extended in the Y-axis direction, and the variance value of the luminance signal row is calculated for each pixel row 18. In the case where it is judged that the calculation of the luminance signal row is terminated within the detection target range (Yes in Step 114), a pixel row 18 having a smallest variance value is selected as connection pixels 19 as shown in FIG. 9B, and the boundary detection process is terminated. Thus, the boundary detection unit 4 functions as a selecting section. The positional information of the selected connection pixels 19 (pixel row 18) is output, as boundary information, to the image connection unit (stitch process unit) 5 with the connection position information output from the connection position detection unit 3.

The variance value of the luminance signal row indicates the degree of spreading out of the luminance values of the pixels in the pixel row 18 from the average value of the luminance signal row. Therefore, in the case where the image part 9 of the subject is positioned on the pixel row 18, the variance value becomes large, and in the case where the image part 9 of the subject is not positioned thereon, the variance value becomes small. Thus, it can be determined that the image part 9 of the subject is not positioned on the pixel row 18 having the smallest variance value. That is, the pixel row 18 having the smallest variance value can be determined to be a pixel row other than the image part 9 of the subject.

Alternatively, a threshold value is predetermined, and the pixel row 18 having a variance value smaller than the predetermined threshold value may be determined to be the pixel row other than the image part 9 of the subject. Then, out of the pixel rows 18 determined to be the pixel row other than the image part 9 of the subject, one of the pixel rows 18 may be selected as the connection pixels 19.

Figure 10:
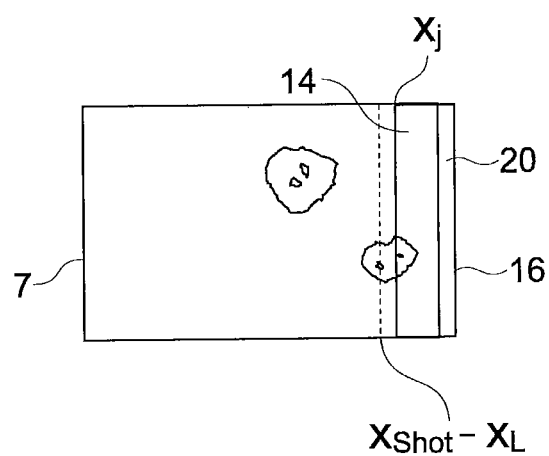
FIG. 10 is a schematic diagram showing the comparison block diagram and the base image which have been subjected to the matching process by the PC shown in FIG. 1.

For example, in some cases, as shown in FIG. 10, the offset coordinate xj at which the base image 7 and the comparison block image 16 are subjected to the appropriate matching and which is detected by the connection position detection unit 3 may be larger than (xShot-xL). In this case, a right end part 20 of the comparison block image 16 is not included in the overlapped region 14 where the base image 7 and the connection image 8 are overlapped with each other. Therefore, the connection pixels 19 are selected from the overlapped region 14 of the images 7 and 8 except the right end part 20 of the comparison block image 16. In Step 114 shown in FIG. 8, the detection target range may be set in the overlapped region 14 except the right end part 20 of the comparison block image 16, and in the overlapped region 14, the luminance signal row for each pixel row 18 may be obtained. Alternatively, the luminance signal row may be obtained from the entire comparison block image 16, and the overlapped region 14 may be set as a selectable range when the connection pixels 19 are selected.

Figure 11A:
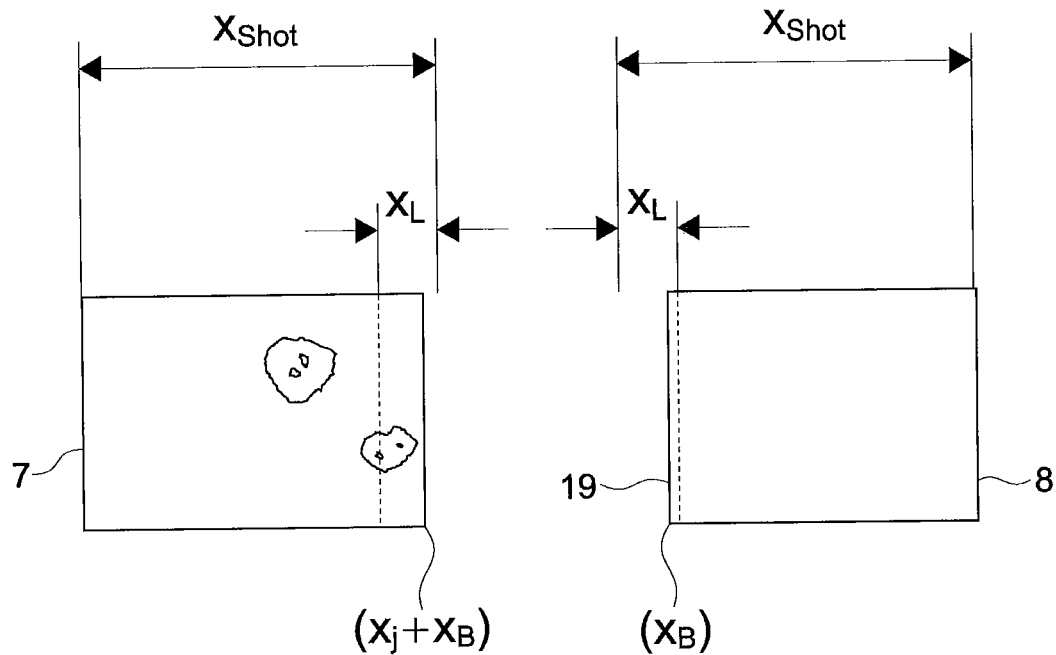
FIGS. 11A and 11B are diagrams for explaining a connection process of the base image and the connection image by the PC shown in FIG. 1.
Figure 11B:
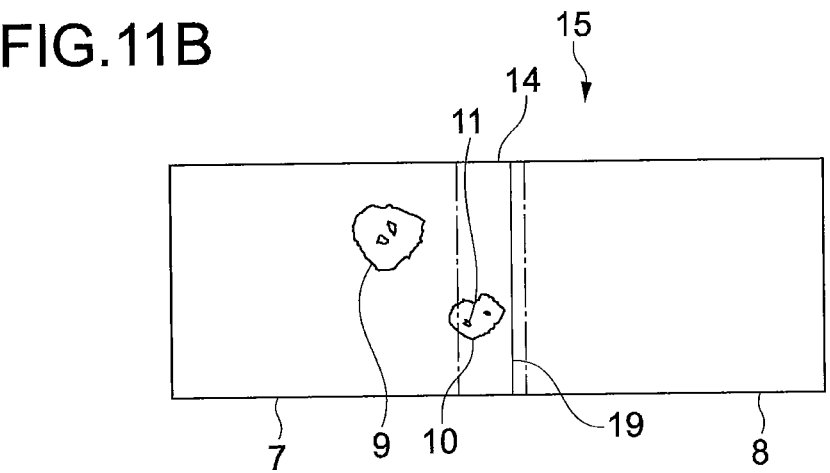

The image connection unit (stitch process unit) 5 synthesizes the base image 7 and the connection image 8 on the basis of the connection position information and the boundary information which are output by the boundary detection unit 4. FIGS. 11A and 11B are diagrams for explaining the connection process of the base image 7 and the connection image 8.

As shown in FIG. 11A, the right end portion of the base image 7 is cut with the connection pixels 19 being the boundary (Step 107 of FIG. 3). The part to be cut is a right-side part including the pixel row corresponding to the position of a coordinate (xj+xB). With the connection pixels 19 as the boundary, the left end part of the connection image 8 is cut (Step 108). The part to be cut is a part on the left side of the pixel row corresponding to the position of the coordinate xB with the left end of the connection image 8 being as a reference. Alternatively, a part on the right side of the pixel row corresponding to the position of a coordinate (xj+xB) of the base image 7 may be cut, and a left-side part including the pixel row corresponding to the position of the coordinate xB of the connection image 8 may be cut. That is, as the information of the connection pixel 19, the information of the base image 7 may be used, or the information of the connection image 8 may be used.

As shown in FIG. 11B, the cut base image 7 and connection image 8 are synthesized so as to be connected, thereby generating one taken image 15 including the image part 9 of the subject (Step 109). As shown in FIG. 11B, in the connection pixels 19 as the boundary between the base image 7 and the connection image 8, the image part 9 of the subject is not located. Therefore, it is possible to prevent an inappropriate connection of the image part 9 of the subject on the boundary between the base image 7 and the connection image 8 and a distortion of the shape of the image part 9. As a result, the images 7 and 8 can be connected so that the subject is represented appropriately in the overlapped region 14 where the base image 7 and the connection image 8 are overlapped with each other.

For example, in the case where the cell fluorescence image 10 as the subject is located on the connection pixels 19 as the boundary between the base image 7 and the connection image 8, the shape of the fluorescence image 10 may be distorted, and the fluorescence image 11 of the nucleus included in the cell may be erased, or two fluorescence images 11 may be represented although only one nucleus exists actually. This may cause a problem in an observation in a cell culture experiment, and a misdiagnosis may be caused when a cell is diagnosed in the pathological field, for example. In the case where the sizes of the base image 7 and the connection image 8 are large, and the sizes of the allowance regions 12 and 13 of the images 7 and 8 are large, the aforementioned problem is likely to arise.

In the stitching process of the base image 7 and the connection image 8 according to this embodiment, however, as shown in FIG. 11B, the connection pixels 19 as the boundary between the base image 7 and the connection image 8 are set in the position where the cell fluorescence image 10 is not located. As a result, the cell fluorescence image 10 and the cell nucleus fluorescence image 11 are represented appropriately, and the aforementioned problem can be prevented. In addition, it is possible to make the boundary between the base image 7 and the connection image 8 less obvious, so the taken image 15 can be generated with high accuracy.

By the file output unit 6, the data of the taken image 15 as the synthesis image generated by the image connection unit (stitch process unit) 5 is converted into a format which is easily dealt with by a user and is stored in the storage unit 108 or the like of the PC 100.

Second Embodiment

A description will be given on an information processing apparatus according to a second embodiment while using a PC as an example. In the following, the description of the structure and action that are the same as those of the PC 100 described in the first embodiment will be omitted or simplified.

Figure 12:
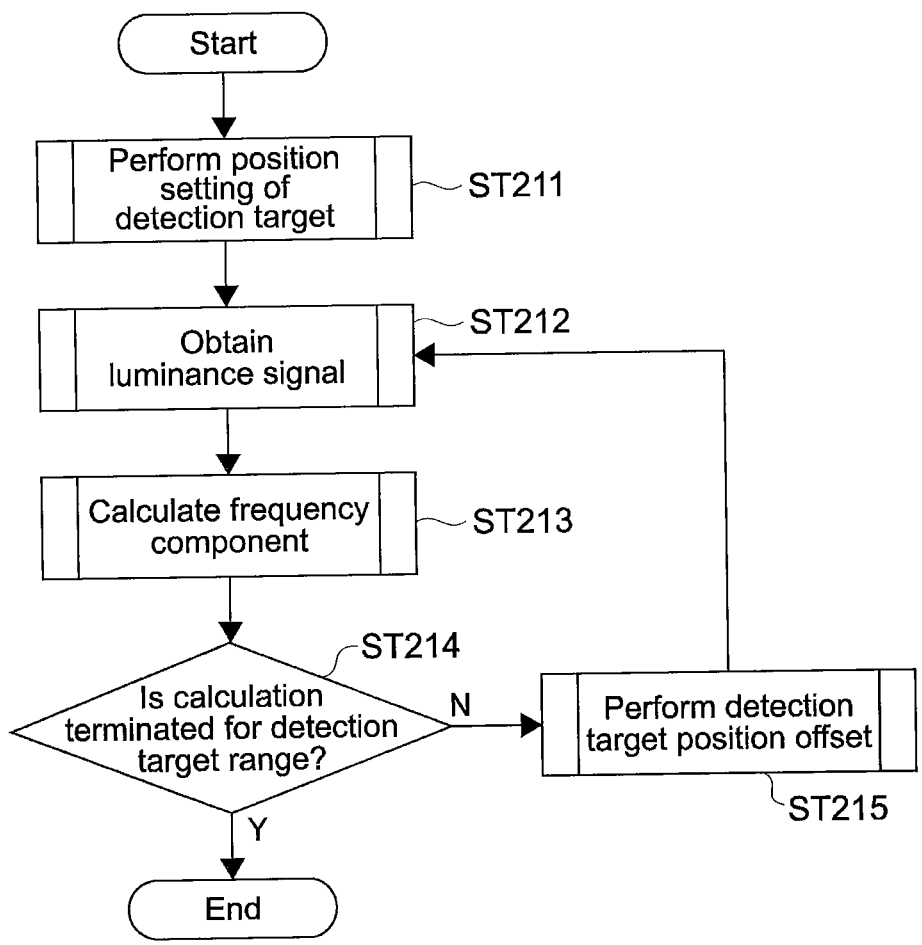
FIG. 12 is a flowchart showing the outline of processing of a PC according to a second embodiment.

FIG. 12 is a flowchart showing the outline of the processing of a PC according to this embodiment. Steps except Step 213 shown in FIG. 12 are the same as Steps except Step 113 shown in FIG. 8 described in the first embodiment.

In the first embodiment, in Step 113 shown in FIG. 8, the variance value of the luminance signal row is calculated for each pixel row in the comparison block image. On the other hand, in this embodiment, in Step 213 of FIG. 12, a frequency component of the luminance signal row is calculated for each pixel row in the comparison block image. Further, a pixel row having a smallest high frequency component is selected as the connection pixels. As the high frequency component, an intensity of a predetermined frequency component may be calculated, or the summation of intensities of the predetermined frequency component or more may be used, for example.

In the case where an image part of a subject is located in the pixel row in the comparison block image, the high frequency component becomes larger, and in the case where the image part of the subject is not located therein, the high frequency component thereof becomes smaller. Thus, it is possible to determine that the pixel row having the smallest high frequency component is the row of pixels other than the image part of the subject.

Alternatively, a threshold value is predetermined, the pixel row having a high frequency component that is smaller than the threshold value may be determined as the row of the pixels other than the image part of the subject. Further, out of the pixel rows determined as the rows of the pixels other than the image part of the subject, any of the pixel rows may be selected as the connection pixels.

As a parameter used at the time of the selection of the connection pixels, an average value of the luminance signal row of the pixel row in the comparison block image may be used. Further, the degree of a so-called dynamic range, which is a difference between a maximum luminance value and a minimum luminance value in the luminance signal row, may be used. Alternatively, at the time when the connection image is taken, a position of the image part of the subject is detected on the basis of the luminance value of each pixel, and the position information may be used, for example.

In addition, on the basis of not each of the luminance signals of the pixels which belong to the comparison block image but color information of each of the pixels, the connection pixels may be selected. For example, a variance value or the like of wavelength components of colors represented by the pixels may be used.

Third Embodiment

Figure 13:
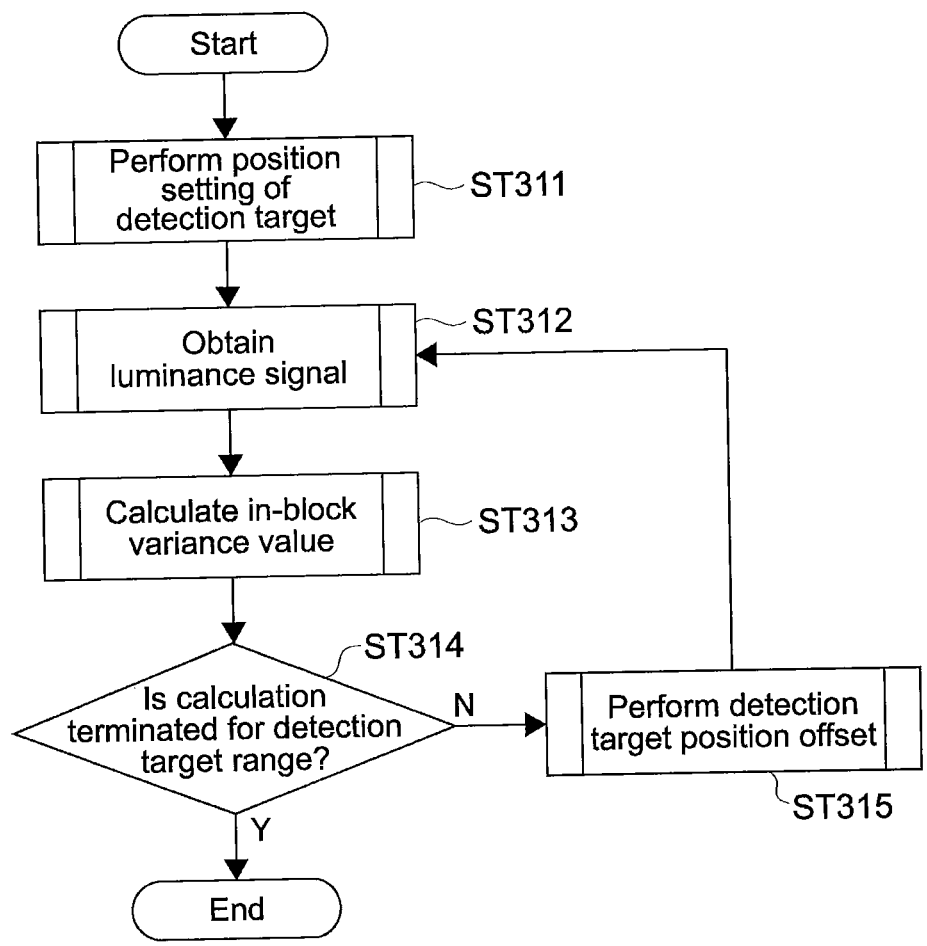
FIG. 13 is a flowchart showing the outline of processing of a PC according to a third embodiment.
Figure 14:
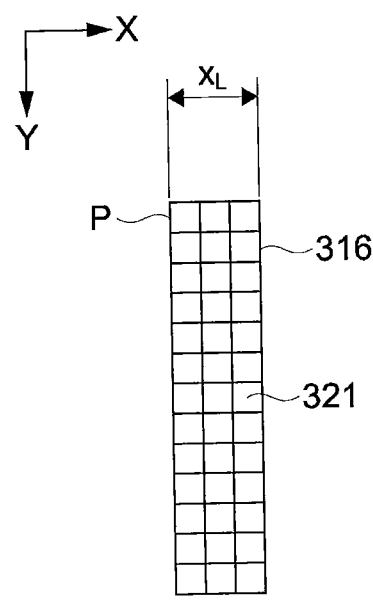
FIG. 14 is a diagram for explaining an in-block variance value calculation process in the flowchart shown in FIG. 13.

FIG. 13 is a flowchart showing the outline of the processing of a PC according to this embodiment. FIGS. 14 and 15 are diagrams for explaining an in-block variance value calculation process in the flowchart shown in FIG. 13.

In the PC of this embodiment, a connection pixel 319 is selected as follows. First, as shown in FIG. 14, a plurality of division block images 321 are generated as block images for dividing a comparison block image 316 in the X-axis direction and the Y-axis direction. The process for segmentalizing the comparison block image 316 may be carried out by the connection position detection unit 3 shown in FIG. 2. Alternatively, blocks for the segmentalizing process may be independently provided. It should be noted that the size of the division block image 321 and the number of division block images 321 may be set as appropriate.

The position of the division block image 321 as a detection target is set (Step 311). In this embodiment, a position P of the division block image 321 that is located at the upper left of the comparison block image 316 is determined as a position in an initial setting.

A luminance signal group as a set of luminance signals of pixels in the division block image 321 is obtained (Step 312), and the variance value of the luminance signal group is calculated (Step 313). It is judged whether or not the calculation of the variance value is terminated in a detection target range, that is, whether or not the variance value of the luminance signal group is calculated for all the division block images 321 (Step 314). In the case where it is judged that the variance value of the luminance signal group is not calculated for all the division block image 321 (No in Step 314), the division block image 321, the variance value of which is not calculated, is calculated as the next detection target position (Step 315).

The detection target position offset process of Step 315 may be performed for the images on a continuous line, for example. Alternatively, the variance values of the division block images 321 may be sequentially calculated in the X-axis direction, then the detection position may be offset in the Y-axis direction, and the variance values of the division block images 321 may be sequentially calculated in the X-axis direction again.

Figure 15A:
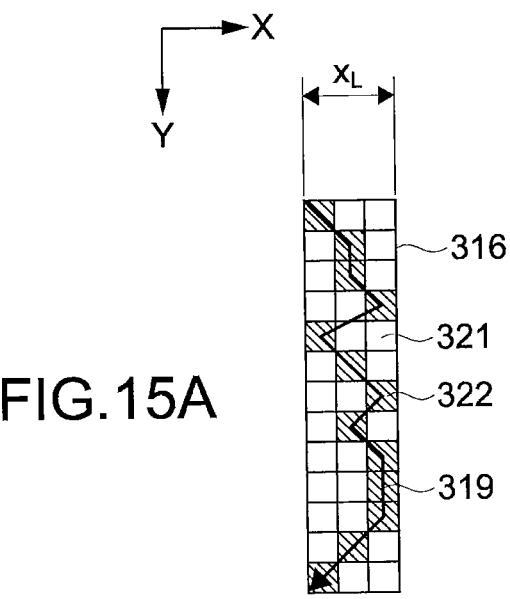
FIGS. 15A and 15B are diagrams for explaining an in-block variance value calculation process in the flowchart shown in FIG. 13.
Figure 15B:
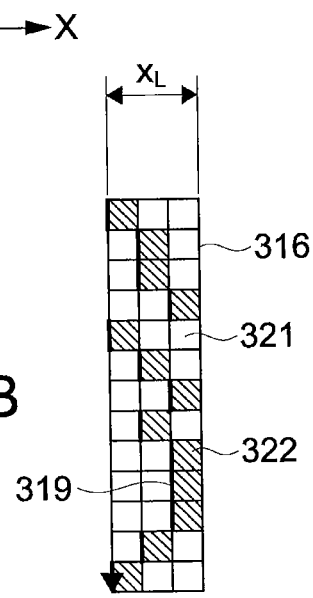

Upon completion of the calculation of the variance values for all the division block images 321, pixels other than the image part of the subject are determined on the basis of the variance values of the division block images 321, and the connection pixels 319 are selected from the pixels. With reference to FIGS. 15A and 15B, an example of a method for selecting the connection pixels 319 will be described.

The comparison block image 316 shown in FIGS. 15A and 15B is divided by the plurality of division block images 321, which are arranged in three blocks in the X-axis direction and in thirteen blocks in the Y-axis direction. Out of the division block images 321 arranged in three blocks in the X-axis direction among the images, the division block image 321 having the smallest variance value is selected as a connection block image 322. Thirteen connection block images 322 are selected along the Y-axis direction. In FIGS. 15A and 15B, the selected connection block images 322 are distinctively shown.

In this embodiment, the pixels that belong to the connection block images 322 are determined as pixels other than the image part of the subject, and the connection pixels 319 are selected from the pixels that belong to the connection block images 322. For example, as shown in FIG. 15A, the centers of the connection block images 322 are connected with straight lines, and the pixels located on the straight lines may be selected as the connection pixels 319. Alternatively, the pixels which are nearest from the straight lines may be selected as the connection pixels 319.

Further, as shown in FIG. 15B, the pixel rows which are located on the left end of each of the connection block images 322 and are extended in the X-axis direction may be selected as the connection pixels 319. The pixel rows which are located on the right end of each of the connection block images 322 may be selected as the connection pixels 319.

In addition, the method for selecting the connection pixels 319 may be selected as appropriate within such a range that the image part of the subject is not located. By selecting the connection pixels 319 on the basis of the variance values of the division block images 321 as described above, it is possible to select the connection pixels 319 not in a straight line manner but in a curved line manner (broken line manner) along the X-axis direction. As a result, it is possible to set the connection pixels 319 as the boundary between the base image and the connection image at the positions where the image part of the subject is not located while flexibly responding to the positions of the image part of the subject.

In addition to the observation, the diagnosis, or the like of the cell, the stitching process by the information processing apparatus according to each of the above embodiments is applicable to a system or the like that digitizes an image of a cell, a tissue, an organ, or the like of a living body which is obtained by an optical microscope, and on the basis of the digitized image, a doctor, a pathologist, or the like examines the tissue or the like or diagnoses a patient in a field of the medicine, the pathology, or the like. Further, in addition to the image obtained with the use of the optical microscope, to other digital images, the stitch process according to the above embodiments is applicable.

Fourth Embodiment

The present disclosure is not limited to the above embodiments, and various other embodiments can be adopted.

In the above embodiments, the description is given on the case where the base image and the connection image are connected in the X-axis direction out of the X-axis and Y-axis directions, which are the two axis directions perpendicular to each other as an example. However, even in the case where the base image and the connection image are connected in the Y-axis direction, the processes as described above can be used.

In the above embodiments, the connection position detection unit calculates the offset coordinate xj at which the base image and the comparison block image are subjected to the appropriate matching. However, the base image and the comparison block image may be subjected to the matching process also in the Y-axis direction, and offset coordinates (xj, yj) in the X-axis direction and in the Y-axis direction may be calculated. Also in this case, in a region where the connection image is overlapped with the base image, pixels other than an image part of a subject are determined, and connection pixels may be selected from the pixels thus determined.

For example, an overlapped region determined on the basis of the offset coordinates (xj, yj) may be set as a detection target range, the variance values of the luminance signal row for each pixel row may be calculated within the range, and on the basis of the variance values, the connection pixels may be selected. Alternatively, the variance values of the luminance signal row may be calculated for an entire comparison block image, and the overlapped region determined by the offset coordinates (xj, yj) may be set as a selectable range at the time when the connection pixels are selected on the basis of the variance values.

In the above embodiments, the PC is used as an example of the information processing apparatus. However, a scanner apparatus or the like having a function of an optical microscope may be used as the information processing apparatus according to this embodiment, and the stitching process according to the above embodiments may be performed by the scanner apparatus.

The algorism described in the above embodiments is an example, and any algorism can be used as long as the identity of the purpose in the respective processing units shown in FIG. 2 is maintained.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. An information processing apparatus for connecting a plurality of images, comprising:
    an obtaining section configured to obtain information of a base image and information of a connection image that each have a plurality of pixels arranged in two axis directions perpendicular to each other and are connected to each other in a first direction out of the two axis directions, the connection image and the base image each having an overlapped region where the connection and the base images are overlapped with each other and constituting a taken image including an image part of a subject by being connected with each other with the overlapped region as a reference;
    a selecting section configured to determine pixels other than the image part of the subject based on a luminance variance value of a luminance signal row for each of pixel rows that are arranged in a second direction out of the two axis directions, a pixel row having a luminance variance value smaller than a predetermined value being determined as the pixels other than the image part of the subject, and from the pixels determined, select a pixel row having a smallest luminance variance value as connection pixels corresponding to a position where the base image and the connection image are connected with each other in the overlapped region; and
    image connection section configured to connect the base image and the connection image with the connection pixels being a boundary between the base image and connection image to generate the taken image including the image part of the subject.

2. The information processing apparatus according to claim 1, wherein further comprising
    a generating section configured to generate a plurality of block images that divide, in the first direction and a second direction that is different from the first direction out of the two axis directions, the overlapped region of the connection image where the connection image is overlapped with the base image, wherein
    the selecting section is configured to select a plurality of connection block images along the second direction that are the block images each having a smallest luminance variance value in the plurality of block images arranged in the first direction, based on a luminance variance value of a luminance signal group for each of the plurality of block images, and select the connection pixels from pixels that belong to the plurality of connection block images selected.

3. An information processing apparatus for connecting a plurality of images, comprising:
    an obtaining section configured to obtain information of a base image and information of a connection image that each have a plurality of pixels arranged in two axis directions perpendicular to each other and are connected to each other in a first direction out of the two axis directions, the connection image and the base image each having an overlapped region where the connection and the base images are overlapped with each other and constituting a taken image including an image part of a subject by being connected with each other with the overlapped region as a reference;
    a selecting section configured to determine pixels other than the image part of the subject based on a frequency component of a luminance signal row for each of pixel rows that are arranged in a second direction out of the two axis directions, and from the pixels determined, select a pixel row having a smallest high frequency component as connection pixels corresponding to a position where the base image and the connection image are connected with each other in the overlapped region; and
    image connection section configured to connect the base image and the connection image with the connection pixels being a boundary between the base image and connection image to generate the taken image including the image part of the subject.

4. A non-transitory computer-readable medium containing a computer program product for connecting a plurality of images that when executed by a processor causes an information processing apparatus to execute
    obtaining information of a first image and information of a second image that each have a plurality of pixels arranged in two axis directions perpendicular to each other and are connected to each other in a first direction out of the two axis directions, the first image and the second image each having an overlapped region where the first image and the second image are overlapped with each other and constituting a taken image including an image part of a subject by being connected with each other with the overlapped region as a reference;
    determining pixels other than the image part of the subject based on information of a plurality of pixels that belong to the overlapped region of the first image where the first image is overlapped with the second image, the information of the plurality of pixels being included in the obtained information of the first image, and selecting, out of the pixels determined other than the image part of the subject, connection pixels corresponding to a position where the first image and the second image are connected in the overlapped region, wherein the determining the pixels other than the image part of the subject is based on a frequency component of a luminance signal row for each of pixel rows that are arranged in a second direction different from the first direction out of the two axis directions to select the pixel row having a smallest high frequency component as connection pixels; and
    connecting the first image and the second image with the connection pixels being a boundary between the first image and second image to generate the taken image including the image part of the subject.

5. A non-transitory computer-readable medium containing a computer program product for connecting a plurality of images that when executed by a processor causes an information processing apparatus to execute
    obtaining information of a first image and information of a second image that each have a plurality of pixels arranged in two axis directions perpendicular to each other and are connected to each other in a first direction out of the two axis directions, the first image and the second image each having an overlapped region where the first image and the second image are overlapped with each other and constituting a taken image including an image part of a subject by being connected with each other with the overlapped region as a reference, and
    determining pixels other than the image part of the subject based on information of a plurality of pixels that belong to the overlapped region of the first image where the first image is overlapped with the second image, the information of the plurality of pixels being included in the obtained information of the first image, a pixel row having a luminance variance value smaller than a predetermined value being determined as the pixels other than the image part of the subject, and selecting, out of the pixels determined other than the image part of the subject, connection pixels corresponding to a position where the first image and the second image are connected in the overlapped region, wherein the determining the pixels other than the image part of the subject is based on a luminance variance value of a luminance signal row for each of pixel rows that are arranged in a second direction different from the first direction out of the two axis directions to select the pixel row having a smallest luminance variance value as the connection pixel; and connecting the first image and the second image with the connection pixels being a boundary between the first image and second image to generate the taken image including the image part of the subject.

* * * * *